United States Patent [19]
Takahashi

[11] Patent Number: 5,429,790
[45] Date of Patent: Jul. 4, 1995

[54] METHOD FOR PREPARING MULTILAYER DIELECTRIC POWDER CONDENSERS

[76] Inventor: Yasunori Takahashi, 2-5-20 Todoroki, Setagaya-Ku, Tokyo, Japan

[21] Appl. No.: 217,653

[22] Filed: Mar. 25, 1994

[30] Foreign Application Priority Data

Mar. 29, 1993 [JP] Japan .................. 5-091904
Mar. 29, 1993 [JP] Japan .................. 5-091905

[51] Int. Cl.⁶ ........................... B22F 3/16
[52] U.S. Cl. ........................... 419/9; 419/35; 419/36; 419/38
[58] Field of Search ............ 419/8, 10, 35, 9, 36, 419/38

[56] References Cited

U.S. PATENT DOCUMENTS

| | | | |
|---|---|---|---|
| 3,852,877 | 12/1974 | Ahn et al. | 29/625 |
| 4,163,173 | 7/1979 | Norling | 313/352 |
| 4,875,616 | 10/1989 | Nixdorf | 228/120 |
| 4,971,754 | 11/1990 | Fontet et al. | 419/8 |
| 5,144,529 | 9/1992 | Takahashi | 361/323 |

Primary Examiner—Donald P. Walsh
Assistant Examiner—Daniel Jenkins
Attorney, Agent, or Firm—Cushman Darby & Cushman

[57] ABSTRACT

The object of the present invention is to provide a method for preparing small-size and large capacity multilayer dielectric powder condensers capable of employing as the inner electrode materials inexpensive copper alloys or nickel alloys.

The method for preparing multilayer dielectric powder condensers according to the present invention comprises steps of:

providing a fine dielectric powder having a dielectric film on the surface of a metal powder or a semiconductor powder;

preparing a pasty material by kneading the dielectric powder with an organic binder;

forming a filmy sheet from the pasty material;

applying a paste containing a metal powder for forming electrode on the surface of the filmy sheet and drying the applied sheet;

piling a plurality of the sheets;

placing the piled sheets between thin glass sheets made from a paste prepared by kneading a glass powder and an organic binder and pressing them together; and subjecting the piled and pressed sheets to a heat-treatment.

6 Claims, No Drawings

METHOD FOR PREPARING MULTILAYER DIELECTRIC POWDER CONDENSERS

FIELD OF THE INVENTION

The present invention relates to a simplified and an economical method for preparing small-size and large capacity condensers.

DESCRIPTION OF THE PRIOR ART

Explanations are given hereunder about ceramic semiconductor condensers of blocking-layer (BL) type and multilayer (ML) type condensers being used for small-size and large capacity ones.

BL-type condensers are ceramic semiconductor condensers in which ceramic grains are segregated each other with highly insulating materials formed uniformly on the grain boundary, and they are usually prepared by the following method. To a dielectric raw material like barium titanate ($BaTiO_3$), strontium titanate ($SrTiO_3$), calcium titanate ($CaTiO_3$), etc. is added a minute specified amount of an additive including oxides of such tri- or hepta-valent metals as La, Dy, Nd, Y, Nb and Ta which is necessary for the raw material to be turned to semiconductor; the mixture is blended and ground in a ball mill; an organic binder like PVA is added thereto; the resulting raw material is granulated and molded into shapes desired; and the molded material is subjected to a heat-treatment at 1350°–1400° C. under a specified atmosphere to obtain semiconductor ceramics. On the surface of the resulted semiconductor ceramics is applied by use of a screen, etc. a doping agent composed of a metal oxide (MnO, CuO, $Bi_2O_3$, PbO, $Tl_2O_3$, $Sb_2O_3$, $Fe_2O_3$, etc., or mixtures thereof) for insulating exclusively and selectively the grain boundary, and the doping agent is diffused thermally. In another method, the above-mentioned metal oxide is added in the ceramic composition and is thermally diffused after the heat-treatment. Finally, electrodes are combined with the surface by baking.

Other types of large capacity ceramic condensers include multilayer-type (ML-type) condensers, which are prepared by the following method. The raw material ceramic powder is milled, mixed with a binder and turned to sludge; ceramic raw sheets (green sheets) are formed therefrom by cast-sheeting; subjecting the raw sheet to punching to be shaped to predetermined forms; printing inner electrodes; piling and pressing; cutting; sintering the piled multilayer raw chips; combining outer electrodes by baking or electroplating; fitting lead wires; and armored to form a final product.

In the preparative method, the sintering and combining of inner electrodes are achieved simultaneously, and the sintering of raw materials principally composed of barium titanate ($BaTiO_3$), strontium titanate ($SrTiO_3$) or calcium titanate ($CaTiO_3$), etc. is necessarily carried out in air at high temperatures of above 1300° C. In order to prevent the inner electrode materials from oxidation, melting or reacting with ceramic materials under the high temperature sintering conditions, no effective way has been found other than using for the inner electrode an expensive noble metal like platinum or palladium, etc. The inevitable usage of noble metals causes an increase in the cost of the multilayer-type condensers. Though studies are being conducted for ceramic compositions capable of being treated at lower temperatures, the heat-treatment still requires temperatures of around 1000° C. at the present moment. Further, since outer electrodes are combined by baking after sintering, multistage heat-treatment steps are necessary for preparation of the multilayer-type (ML-type) condensers.

SUMMARY OF THE INVENTION

The object of the present invention is to provide a method for preparing small-size and large capacity multilayer dielectric powder condensers capable of employing inexpensive copper alloys or nickel alloys as the inner electrode materials.

The method for preparing multilayer dielectric powder condensers according to the present invention comprises steps of:

providing a fine dielectric powder having a dielectric film on the surface of a metal powder or a semiconductor powder;

preparing a pasty material by kneading the dielectric powder with an organic binder;

forming a filmy sheet from the pasty material;

applying a paste containing a metal powder for forming electrode on the surface of the filmy sheet and drying the applied sheet;

piling a plurality of the sheets;

placing the piled sheets between thin glass sheets made from a paste prepared by kneading a glass powder and an organic binder and pressing them together; and subjecting the piled and pressed sheets to a heat-treatment.

DETAILED DESCRIPTION OF THE PREFERRED EMBODIMENTS

As to the metal powder, powders of metals other than metals in liquid state like mercury, of fusing at treating temperatures or reactive with materials for forming dielectric films are usable, and the metal includes copper, silver, gold, magnesium, strontium, zinc, aluminum, yttrium, lanthanum, cerium, thorium, tin, lead, titanium, zirconium, antimony, bismuth, vanadium, chromium, molybdenum, tungsten, manganese, iron, cobalt, nickel, lutetium, rhodium, palladium and platinum. Among them, those cheaply available ones like iron, copper, nickel, aluminum, etc. are preferred.

Semiconductor powders for the condenser are obtained by reducing sintering of dielectric raw materials and a minute amount of an additive necessary for the raw materials to be turned to semiconductor.

As to the dielectric raw materials, those usually employed like barium titanate ($BaTiO_3$), calcium titanate($CaTiO_3$), strontium titanate ($SrTiO_3$), magnesium titanate ($MgTiO_3$), etc. can be used. The dielectric raw material is preferably a fine powder of as fine as possible, preferably being ground to below 1 $\mu$m, and has uniform particle size. For the minute additive necessary to turn the raw materials to semiconductor, those used conventionally like oxides of such metals as La, Dy, Nd, Y, Nb and Ta can be used. The minute additives are preferably used in the similar size as that of the dielectric raw material.

Mixing ratios of the dielectric raw material to the minute additive is the same as those used conventionally for turning dielectric materials to semiconductors. The raw material composition for semiconductors obtained by blending a specified ratio of the dielectric raw material with the minute additive is ground and subjected to heat-treatment at a temperature of 1300°–1450° C., under an atmosphere containing at least 5% by volume of hydrogen and for a period of time longer than 1 hours in order to be turned to semiconductor. During the treatment, the treating temperature and period of time are preferably so controlled as not the raw material be sintered to a heat-treated semiconductor having a particle size of larger than 5 μm. Sintering of the raw material can be controlled by the use of a rotary kiln as the heat-treating furnace.

The period of time necessary for turning the raw material composition to semiconductor at a temperature of 1300°-1450° C. differs depending on particle sizes of the semiconductor raw material composition. Usually, it takes 1-4 hours, though shorter than one hour may be enough for a material of very small particle size. As to the standard temperature/time cycle for the heat-treatment step at 1300°-1450° C., raising the temperature from room temperature to the preliminary heat-treatment temperature of around 1000° C. by spending about 4-5 hours; continuing the preliminary heat-treatment for about 2-3 hours; raising the temperature to the main heat-treatment temperature of 1300°-1450° C. by spending about 3-4 hours; continuing the main heat-treatment for about 1-4 hours; and lowering the temperature by spending 7-8 hours to room temperature.

The metal powder or semiconductor powder has preferably a particle size of smaller than 5 μm. When the particle size is larger, capacitance of each particle can be larger, however, the thickness of filmy sheet formed from a paste of dielectric powder having a dielectric film on the surface tends to become larger, and so the capacitance per unit volume of the multilayer condenser is inclined to be smaller.

The above-mentioned dielectric powder is prepared by forming a dielectric film on the surface of the metal powder or the semiconductor powder. Practical ways for forming the dielectric film are: 1) a vitrification agent is baked on the surface of the metal powder or the semiconductor powder; 2) a film-forming silicone oil is baked on the surface of the metal powder or the semiconductor powder; 3) a film-forming organometallic compound is baked on the surface of the metal powder or the semiconductor powder; and 4) a re-oxidized dielectric film is formed on the surface of the metal powder or the semiconductor powder by oxidation of the surface. These methods will be explained in detail hereunder.

As to the vitrification agent, metal oxides used usually in the preparation of multilayer semiconductor condensers as doping agents like MnO, CuO, $Bi_2O_3$, PbO, $Tl_2O_3$, $Sb_2O_3$, $Fe_2O_3$, etc., and mixtures thereof are employable. To a metal powder or a semiconductor powder mentioned-above is added a vitrification agent, and the mixture is heat-treated to form dielectric film from the verification agent on the surface of the metal powder or the semiconductor powder to result in a dielectric powder. Temperatures of the heat-treatment differ according to the verification agent used, but 100°-700° C. is usual for a treatment under air or an inert atmosphere. The thickness of dielectric film obtained by use of a verification agent is around 0.1-1 μm, and no thinner film is available.

As to the silicone oil, those capable of forming a film on the surface of a metal or a semiconductor powder upon baking can be mentioned, which includes dimethyl silicone oil, methylphenyl silicone oil, etc. To a metal powder or a semiconductor powder is added the silicone oil having an appropriate viscosity adjusted with an organic solvent if necessary, and the mixture is heat-treated to form dielectric film from the silicone oil on the surface of the metal powder or the semiconductor powder to result in a dielectric powder. The heat-treatment is usually conducted at 100°-700° C. under air or an inert atmosphere. The dielectric film obtained by use of the silicone oil can be so thin as around 5-10 Å.

As to the organometallic compound, those having a property of forming oxide film on the surface of a metal or a semiconductor powder upon baking can be mentioned, which includes organotitanium compounds, organotitanium compounds, organonickel compounds, organosilicon compounds, organotin compounds, etc. To a metal powder or a semiconductor powder is added the organometallic compound having an appropriate viscosity adjusted with an organic solvent if necessary, and the mixture is heat-treated to form a dielectric film from the organometallic compound on the surface of the metal powder or the semiconductor powder to result in a dielectric powder. The heat-treatment is usually conducted at 100°-700° C. under air or an inert atmosphere. Since the dielectric film obtained on the surface of the metal powder or the semiconductor powder by baking has a thickness of the order of 0.1-1 Å, the organometallic compound, though usually expensive, is best suited for the production of large capacity condensers.

As to the method of forming a re-oxidized dielectric film on the surface of a metal powder or a semiconductor powder by oxidation of the surface, mention is made of a simplified way in which a metal powder or a semiconductor powder is firstly immersed in a treating liquid prepared by diluting with water such oxidizing agents as sulfuric acid, nitric acid, hydrogen peroxide, etc. or hydrochloric acid, acetic acid, etc. in order for changing the surface condition, and then dried in the air by heating. By subjecting the surface to the immersion, it is possible to form a re-oxidized dielectric film only on the surface of the metal powder or the semiconductor powder at temperatures lower than those for oxidizing untreated powders in air. Preferably used treating liquids are reagent-grade sulfuric acid (98% purity), nitric acid (63% purity) and hydrochloric acid (36% purity) diluted with around 500-1000 times of water. A preferable acetic acid treating liquid contains around 4-5% of the pure component. Treating liquids of too much concentration bring about a too thick re-oxidized dielectric film and those of too much dilution require too long period of time for the immersion, both of which are not preferred. It is convenient for the operation that the concentration of the treating liquid is so adjusted as to make the immersion time to be around one hour.

To thus obtained dielectric fine powder is then added an organic binder and the mixture is kneaded to prepare a pasty material. Plasticizers, dispersing agents and solvents may be added if desired. The organic binder includes ethylcellulose, PVA (polyvinylalcohol), PVB (polyvinylbutyral), acrylic polymers, etc.; plasticizer includes polyethyleneglycol, phthalic esters, etc.; dispersing agent includes glycerin, ethyl oleate, oleic acid monoglyceride, etc.; and solvent includes acetone, MEK (methylethylketone), methanol, ethanol, cyclohexanon, water, etc. Though those used usually are employable, PVB is especially preferred as the binder.

For the step of preparing thin filmy sheets from the above-mentioned pasty material, the doctor blade method is usually employed, and the thickness of sheet is not specifically restricted but is usually less than 50 μm, preferably is less than 30 μm.

Then, a paste containing fine powder of a metal to serve as a material for electrodes is applied to specified portions on the surface of the thin filmy sheet, and the coated sheet is dried.

As the material for electrodes, though those used conventionally like platinum, palladium, etc. in blocking-layer (BL) type or multilayer (ML) type semiconductor condensers are of course employable, a paste composed of inexpensive fine powder of a copper alloy or a nickel alloy dispersed in an appropriate organic binder can be used in the present invention due to the low-temperature heat-treatment.

As to the organic binder used for the paste containing a copper alloy or a nickel alloy, various resins dissolved in organic solvents are employed. For the resin, such features as the solubility to solvent, viscosity, decomposition during heating, combustion conditions, reactivity with copper alloys or nickel alloys and stability during long period of time are to be considered. For the organic binder is required such characteristics as capable of (1) dispersing uniformly copper alloys or nickel alloys and homogeneous and smooth dried and combustible layers are obtainable; (2) controlling the viscosity of paste thereby preferable printability is obtainable; (3) films having appropriate dry film strength are obtainable; (4) controlling the sintering speed of copper alloy or nickel alloy during sintering thereby compact burn-out layers are obtainable; and (5) controlling the content of copper alloys or nickel alloys thereby specified burn-out layers are obtainable. Typical organic binders include acrylic resins, phenolic resins, alkyd resins, rosin esters, celluloses, etc.

For organic solvents dissolving these resins, properties required are those capable of (1) having stable printability and being evaporated swiftly at low temperatures during drying step to form dried film; (2) being scarce of sheet-attacking property; and (3) controlling easily the metal content and viscosity of paste. Typical organic solvents include alcohols, hydrocarbons, ethers, esters, etc.

The shape of electrode to be coated on the surface of sheet is formed preferably into a rectangle with small fins at both sides of one end to become a T-shape, and electrodes of the piled sheets are connected electrically at the fins.

Then, the sheets having respectively at a specified position of the surface a dried coating of paste containing a metal for the electrode such as copper alloy or nickel alloy are piled. The piling of sheets is carried out in a manner similar to that for ordinary multilayer condensers, in which each sheet having a biased (with fins) print of electrode on the surface is piled alternatively in opposite direction to build up finally a pair of comb-like electrodes positioned face to face. The number of piles may be determined in accordance with desired capacity of the condenser.

The thus-formed piled sheets are placed between thin glass sheets prepared from a paste made with a glass powder and an organic binder, and they are pressed together. The thin glass sheet has preferably a thickness of around 100–500 $\mu m$. During the succeeding heat-treatment, the fine powder of glass in the thin glass sheet diffuses and covers the surface of the piled sheets, and prevent the final product from deterioration by moisture absorption. The paste made with a glass powder and an organic binder may be coated on sides of the sheets, if necessary.

The multilayer dielectric condensers are obtained by heat-treating the pressed piled sheets, and the heat-treatment is preferably conducted firstly by subjecting the sheet to a preliminary heat-treatment at relatively low temperatures for elimination of the organic binders, and then to a final heat-treatment at 180°–900° C. The preliminary heat-treatment for elimination of binders lessens such defects generated after the heat-treatment as delamination and crack, though the treating temperature depends on binder systems.

The final heat-treatment is conducted generally under air or an inert atmosphere for a period of time of more than one hour. During the treatment, combining of metallic electrodes is accomplished. Outer electrodes may be combined by baking simultaneously with inner electrodes or may be formed later by electroplating. Lead wires are connected thereafter, and armored to obtain a finished product.

The multilayer dielectric powder condenser according to the present invention can employ as the inner electrode copper alloys or nickel alloys being lower resistivity in comparison with palladium employed conventionally, and thus the dielectric dissipation factor (tan $\delta$) becomes smaller and improved high-frequency features are achieved.

The multilayer dielectric powder condenser according to the present invention can remarkably be small-size and large capacity due to the piling in addition to characteristics of blocking-layer condensers. That is, in order to obtain a product having a capacitance of 100 $\mu F$, 60 layers are required for conventional multilayer condenser (ML-type) in contrast to 20 or less layers are enough for multilayer dielectric powder condensers of the present invention.

The present invention will be explained hereunder in detail with reference to Examples, however, it should be noted that the present invention never be restricted by the following Examples.

EXAMPLE 1

To 100 parts by weight of iron powder having a particle size of 0.5 $\mu m$ were added 1 part by weight of a vitrification agent composed of 64 wt. % of PbO, 32 wt. % of $Bi_2O_3$, 3 wt. % of $B_2O_3$ and 1 wt. % of $Ti_2O_3$, and water to obtain a 40 wt. % solid slurry. The slurry was mixed thoroughly in a soundmill, and then dried. The resulted fine powder was heated up to 500° C. under an atmosphere of air and a temperature rise of 200° C./hr, kept at 500° C. for 2 hours, cooled to room temperature under a temperature lowering of 200° C./hr, and a dielectric powder having a dielectric film (thickness: about 1 $\mu m$) of the vitrification agent on the surface of metal powder was obtained.

To 100 parts by weight of the dielectric powder were added 10 parts by weight of a binder polyvinylbutyral (PVB) and 50 parts by weight of thinner as a solvent, and the mixture was kneaded to be pasty.

A filmy sheet of 30 $\mu m$ thickness was prepared from the paste.

To the surface of the filmy sheet was coated in a thickness of 2 $\mu m$ a paste containing a copper alloy to be served as the inner or outer electrodes. The shape of the inner electrode was a rectangle of 11.5 mm width $\times$ 22.5 mm length with fins of 0.75 mm width $\times$ 2.5 mm length at both upper sides, in other words, a T-shape composed of a horizontal bar of 13.0 mm width $\times$ 2.5 mm length and a vertical bar of 11.5 mm width $\times$ 20.0 mm length.

After the paste was dried, 20 layers of the filmy sheet printed with inner electrode were piled so as the biased print of fins were piled alternatively in opposite direction.

Between two 300 μm thickness sheets of a glass powder sheet made from a paste prepared by mixing and kneading 100 parts by weight of glass powder (GA-8/500: NIPPON DENKI GARASU Co.), 10 parts by weight of binder polyvinylbutyral (PVB) and 50 parts by weight of thinner (MEK: toluene: methanol = 1:1:1), the piled sheets were placed and they are pressed together.

An electrode paste (prepared by mixing and kneading 85 parts by weight of silver powder, 10 parts by weight of PVB and 5 parts by weight of glass powder GA-8/500) was coated on the outer edge of the fins so as the inner and outer electrodes could be connected. The piled and pressed sheets were heated up to 280° C. under an atmosphere of air and a temperature rise of 50° C./hr, kept at 280° C. for 2 hours to eliminate the binder, and then cooled. The resulted sheet was cut to chips (13 mm width × 22.5 mm length).

The chips were heated up to 400° C. under a temperature rise of 200° C./hr, kept at 400° C. for 2 hours to finish the final heat treatment, and cooled under a temperature lowering of 200° C./hr to room temperature.

The multilayer dielectric powder condenser being a cut chip of 13 mm width and 22.5 mm length (about 0.35 mm thickness; about 1.0 mm inclusive of top and bottom glass layers) had: capacitance 100 μF ± 10%; $\epsilon_s$ 7.8 × 10$^4$; tanδ(%) 0.10; insulation resistance 8.8 × 10$^5$ MΩ/cm$^3$; dielectric strength 1800 V/mm; temperature character B; and voltage character 0. Similar results were obtained by the use of a paste containing a nickel alloy for the electrode material.

EXAMPLE 2

A multilayer dielectric powder condenser was prepared by the same procedure as that of Example 1 with the exception that a nickel powder having a particle size of 2.0 μm was used in place of the iron powder.

The characteristics of a cut chip of 13 mm width and 22.5 mm length (about 0.35 mm thickness; about 1.0 mm inclusive of top and bottom glass layers) had: capacitance 168 μF ± 10%; $\epsilon_s$ 8.6 × 10$^4$; tanδ(%) 0.08; insulation resistance 7.8 × 10$^5$ MΩ/cm$^3$; dielectric strength 1600 V/mm; temperature character B; and voltage character 0.

EXAMPLE 3

A multilayer dielectric powder condenser was prepared by the same procedure as that of Example 1 with the exception that a copper powder having a particle size of 2.0 μm was used in place of the iron powder.

The characteristics of a cut chip of 13 mm width and 22.5 mm length ( about 0.35 mm thickness; about 1.0 mm inclusive of top and bottom glass layers) had: capacitance 178 μF ± 10%; $\epsilon_s$ 9.8 × 10$^4$; tanδ(%) 0.10; insulation resistance 8.7 × 10$^5$ MΩ/cm$^3$; dielectric strength 1580 V/mm; temperature character B; and voltage character 0.

EXAMPLE 4

A multilayer dielectric powder condenser was prepared by the same procedure as that of Example 1 with the exception that an aluminum powder having a particle size of 1.0 μm was used in place of the iron powder.

The characteristics of a cut chip of 13 mm width and 22.5 mm length (about 0.35 mm thickness; about 1.0 mm inclusive of top and bottom glass layers) had: capacitance 128 μF ± 10%; $\epsilon_s$ 6.8 × 10$^4$; tanδ(%) 0.07; insulation resistance 9.6 × 10$^5$ MΩ/cm$^3$; dielectric strength 1880 V/mm; temperature character B; and voltage character 0.

EXAMPLE 5

To 100 parts by weight of a nickel powder having a particle size of 1.0 μm were added 5 ml of a silicone oil (dimethyl silicone oil, KF-96, viscosity 100cSt/25° C., SHIN-ETSU SILICONE Co.) and 25 ml of MEK (methylethylketone) to obtain a slurry. The slurry was mixed in a soundmill, and then dried. The resulted fine powder was heated up to 500° C. under an atmosphere of air and a temperature rise of 200° C./hr, kept at 500° C. for 2 hours, cooled to room temperature under a temperature lowering of 200° C./hr, and a dielectric powder having on the surface a baked dielectric film of silicone oil (thickness of about 10 Å) was obtained.

A multilayer dielectric powder condenser was prepared by the same procedure as that of Example 1 with the exception that the thus-obtained dielectric powder was used in place of the iron-base dielectric powder.

The characteristics of a cut chip of 13 mm width and 22.5 mm length (about 0.35 mm thickness; about 1.0 mm inclusive of top and bottom glass layers) had: capacitance 160 μF ± 10%; $\epsilon_s$ 8.3 × 10$^4$; tanδ(%) 0.6; insulation resistance 1.5 × 10$^5$ MΩ/cm$^3$; dielectric strength 1080 V/mm; temperature character B; and voltage character 0.

EXAMPLE 6

A multilayer dielectric powder condenser was prepared by the same procedure as that of Example 5 with the exception that an iron powder having a particle size of 0.5 μm was used in place of the nickel powder.

The characteristics of a cut chip of 13 mm width and 22.5 mm length (about 0.35 mm thickness; about 1.0 mm inclusive of top and bottom glass layers) had: capacitance 186 μF ± 10%; $\epsilon_s$ 12.6 × 10$^4$; tanδ(%) 0.5; insulation resistance 1.7 × 10$^5$ MΩ/cm$^3$; dielectric strength 1180 V/mm; temperature character B; and voltage character 0.

EXAMPLE 7

A multilayer dielectric powder condenser was prepared by the same procedure as that of Example 5 with the exception that an aluminum powder having a particle size of 2.0 μm was used in place of the nickel powder.

The characteristics of a cut chip of 13 mm width and 22.5 mm length (about 0.35 mm thickness; about 1.0 mm inclusive of top and bottom glass layers) had: capacitance 178 μF ± 10%; $\epsilon_s$ 10.5 × 10$^4$; tanδ(%) 0.4; insulation resistance 1.8 × 10$^5$ MΩ/cm$^3$; dielectric strength 1210 V/mm; temperature character B; and voltage character 0.

EXAMPLE 8

A multilayer dielectric powder condenser was prepared by the same procedure as that of Example 5 with the exception that a copper powder having a particle size of 2.0 μm was used in place of the nickel powder.

The characteristics of a cut chip of 13 mm width and 22.5 mm length (about 0.35 mm thickness; about 1.0 mm inclusive of top and bottom glass layers) had: capacitance 188 μF±10%; $\epsilon_s$ 11.0×10$^4$; tanδ(%) 0.33; insulation resistance 1.45×10$^5$ MΩ/cm$^3$; dielectric strength 1260 V/mm; temperature character B; and voltage character 0.

EXAMPLE 9

To 100 parts by weight of a nickel powder having a particle size of 1.0 μm were added 25 ml of an organotitanium compound (ATORON NTi-500, NIPPON SODA Co.) and 100 ml of MEK (methylethylketone) to obtain a slurry. The slurry was mixed in a soundmill, and then dried. The resulted fine powder was heated up to 500° C. under an atmosphere of air and a temperature rise of 200° C./hr, kept at 500° C. for 2 hours, cooled to room temperature under a temperature lowering of 200° C./hr, and a dielectric powder having on the surface a dielectric film (thickness: about 1 Å) of titanium oxides was obtained.

A multilayer dielectric powder condenser was prepared by the same procedure as that of Example 1 with the exception that the thus-obtained dielectric powder was used in place of the iron-base dielectric powder.

The characteristics of a cut chip of 13 mm width and 22.5 mm length (about 0.35 mm thickness; about 1.0 mm inclusive of top and bottom glass layers) had: capacitance 220 μF±10%; $\epsilon_s$ 12.5×10$^4$; tanδ(%) 0.3; insulation resistance 11.6×10$^5$ MΩ/cm$^3$; dielectric strength 1240 V/mm; temperature character B; and voltage character 0.

EXAMPLE 10

A multilayer dielectric powder condenser was prepared by the same procedure as that of Example 9 with the exception that an iron powder having a particle size of 0.5 μm was used in place of the nickel powder.

The characteristics of a cut chip of 13 mm width and 22.5 mm length (about 0.35 mm thickness; about 1.0 mm inclusive of top and bottom glass layers) had: capacitance 200 μF±10%; $\epsilon_s$ 11.8×10$^4$; tanδ(%) 0.25; insulation resistance 11.5×10$^5$ MΩ/cm$^3$; dielectric strength 1180 V/mm; temperature character B; and voltage character 0.

EXAMPLE 11

A multilayer dielectric powder condenser was prepared by the same procedure as that of Example 9 with the exception that an aluminum powder having a particle size of 2.0 μm was used in place of the nickel powder.

The characteristics of a cut chip of 13 mm width and 22.5 mm length (about 0.35 mm thickness; about 1.0 mm inclusive of top and bottom glass layers) had: capacitance 230 μF±10%; $\epsilon_s$ 12.8×10$^4$; tanδ(%) 0.31; insulation resistance 11.8×10$^5$ MΩ/cm$^3$; dielectric strength 1260 V/mm; temperature character B; and voltage character 0.

EXAMPLE 12

A multilayer dielectric powder condenser was prepared by the same procedure as that of Example 9 with the exception that a copper powder having a particle size of 2.0 μm was used in place of the nickel powder.

The characteristics of a cut chip of 13 mm width and 22.5 mm length (about 0.35 mm thickness; about 1.0 mm inclusive of top and bottom glass layers) had: capacitance 233 μF +10%; $\epsilon_s$ 13.0×10$^4$; tanδ(%) 0.33; insulation resistance 10.8×10$^5$ MΩ/cm$^3$; dielectric strength 1080 V/mm; temperature character B; and voltage character 0.

EXAMPLE 13

Nickel powder having a particle size of 1.0 μm was immersed in rice vinegar (content of acetic acid: 4.5 wt. %) for one hour, and then dried. The dried powder was heated up to 500° C. under an atmosphere of air and a temperature rise of 200° C./hr, kept at 500° C. for 2 hours, cooled to room temperature under a temperature lowering of 200° C./hr, and a dielectric powder having a nickel oxide film on the surface nickel powder was obtained. The thickness of the nickel oxide was about 10–20 Å through the observation with an electron microscope.

A multilayer dielectric powder condenser was prepared by the same procedure as that of Example 1 with the exception that the thus-obtained dielectric powder was used in place of the iron-base dielectric powder.

The characteristics of a cut chip of 13 mm width and 22.5 mm length (about 0.35 mm thickness; about 1.0 mm inclusive of top and bottom glass layers) had: capacitance 128 μF±10%; $\epsilon_s$ 7.8×10$^4$; tanδ(%) 0.58; insulation resistance 1.35×10$^5$ MΩ/cm$^3$; dielectric strength 1120 V/mm; temperature character B; and voltage character 0.

EXAMPLE 14

Nickel powder having a particle size of 1.0 μm was immersed in a hydrochloric acid (reagent grade: purity 36%) diluted with 1000 times water for one hour, and then dried. The dried powder was heated up to 500° C. under an atmosphere of air and a temperature rise of 200° C./hr, kept at 500° C. for 2 hours, cooled to room temperature under a temperature lowering of 200° C./hr, and a dielectric powder having an oxidized nickel film on the surface nickel powder (thickness of about 10–20A) was obtained.

A multilayer dielectric powder condenser was prepared by the same procedure as that of Example 1 with the exception that the above-mentioned dielectric powder was used.

The characteristics of a cut chip of 13 mm width and 22.5 mm length (about 0.35 mm thickness; about 1.0 mm inclusive of top and bottom glass layers) had: capacitance 110 μF±10%; $\epsilon_s$ 8.98×10$^4$; tanδ(%) 0.30; insulation resistance 1.9×10$^5$ MΩ/cm$^3$; dielectric strength 1200 V/mm; temperature character B; and voltage character 0.

Similar multilayer dielectric condensers were obtained by the similar procedure using a sulfuric acid (reagent grade: purity 98%) diluted with 1000 times of water or a nitric acid (reagent grade: purity 63%) in place of the hydrochloric acid diluted with 1000 times water.

EXAMPLE 15

To 97.0 wt. % of an extra-reagent grade SrTiO$_3$ were added as the additives for semiconductor 2.25 wt. % of extra-reagent grade Nb$_2$O$_3$, 0.25 wt. % of ZnO, 0.5 wt. % of GeO and water to obtain a 40 wt. % solid slurry. The slurry was mixed thoroughly in a soundmill, and then dried. The resulted fine powder raw material composition for ceramic semiconductor was subjected to a reducing heat-treatment, in which the material was heated in a rotary kiln up to 1000° C. under an atmosphere containing 5 volume % hydrogen and 95 volume % of nitrogen and a temperature rise of 125° C./hr, kept at 1000° C. for 2 hours, heated further up to 1380° C. under a temperature rise of 125° C./hr, kept at 1380° C. for 3 hours for reducing heat-treatment, cooled to room temperature under a temperature lowering of 200° C./hr, and a powdery semiconductor (SrTi) was obtained. The powdery semiconductor had a particle size of smaller than 5 μm. To 100 parts by weight of the powdery semiconductor were added 1 part by weight of a vitrification agent composed of 64 wt. % of PbO, 32 wt. % of $Bi_2O_3$, 2 wt. % of $B_2O_3$, 2 wt. % of $Ti_2O_3$, and water to obtain a 40 wt. % solid slurry. The slurry was mixed thoroughly in a soundmill, and then dried. The resulted fine powder was heated up to 500° C. under an atmosphere of air and a temperature rise of 200° C./hr, kept at 500° C. for 2 hours, cooled to room temperature under a temperature lowering of 200° C./hr, and a dielectric powder having a dielectric film of the vitrification agent on the surface of semiconductor powder was obtained.

To 100 parts by weight of the dielectric powder were added 10 parts by weight of a binder polyvinylbutyral (PVB) and 50 parts by weight of a solvent (MEK: toluene: methanol=1:1: 1), and the mixture was kneaded to be pasty.

A filmy sheet of 30 μm thickness was prepared from the paste.

To the surface of the filmy sheet was coated in a thickness of 2 μm a paste containing a copper alloy to be served as the inner or outer electrodes. The shape of the inner electrode was a rectangle of 11.5 mm width × 22.5 mm length with fins of 0.75 mm width × 2.5 mm length at both upper sides, in other words, a T-shape composed of a horizontal bar of 13.0 mm width × 2.5 mm length and a vertical bar of 11.5 mm width × 20.0 mm length.

After the paste was dried, 20 layers of the filmy sheet printed with inner electrode were piled so as the biased print of fins were piled alternatively in opposite direction.

Between two 300 μm thickness sheets of a glass powder sheet made from a paste prepared by mixing and kneading 100 parts by weight of glass powder (GA-8/500: NIPPON DENKI GARASU Co.), 10 parts by weight of binder polyvinylbutyral (PVB) and 50 parts by weight of thinner (MEK: toluene: methanol=1:1:1), the piled sheets were placed and pressed together.

An electrode paste (prepared by mixing and kneading 85 parts by weight of silver powder, 10 parts by weight of PVB and 5 parts by weight of glass powder GA-8/500) was coated on the outer edge of fins so as the inner and outer electrodes could be connected. The piled and pressed sheets were heated up to 280° C. under an atmosphere of air and a temperature rise of 50° C./hr, kept at 280° C. for 2 hours to eliminate the binder, and then cooled. The resulted sheet was cut to chips (13 mm width × 22.5 mm length).

The chips were heated up to 500° C. under a temperature rise of 200° C./hr, kept at 500° C. for 2 hours to finish the final heat treatment, and cooled under a temperature lowering of 200° C./hr to room temperature.

The multilayer dielectric powder condenser being a cut chip of 13 mm width and 22.5 mm length (about 0.35 mm thickness; about 1.0 mm inclusive of top and bottom glass layers) had: capacitance 100 μF±10%; $\epsilon_s$ 8.3×10$^4$; tanΩ(%) 0.6; insulation resistance 1.5×10$^5$ MΩ/cm$^3$; dielectric strength 1080 V/mm; temperature character B; and voltage character 0.

Similar results were obtained by the use of a paste containing a nickel alloy for the electrode material.

EXAMPLE 16

To 100 parts by weight of the powdery semiconductor prepared in Example 15 were added 5 ml of a silicone oil (dimethyl silicone oil, KF-96, viscosity 100cSt/25° C. SHIN-ETSU SILICONE Co.) and 25 ml of MEK (methylethylketone). The slurry was mixed in a soundmill, and then dried. The resulted fine powder was heated up to 500° C. under an atmosphere of air and a temperature rise of 200° C./hr, kept at 500° C. for 2 hours, cooled to room temperature under a temperature lowering of 200° C./hr, and a dielectric powder having a baked dielectric film of silicone oil (about 10 Å thickness) on the surface of powdery semiconductor (SrTi) was obtained.

A multilayer dielectric powder condenser was prepared by the same procedure as that of Example 15 with the exception that the thus-obtained dielectric powder was used.

The multilayer dielectric powder condenser being a cut chip of 13 mm width and 22.5 mm length (about 0.35 mm thickness; about 1.0 mm inclusive of top and bottom glass layers) had: capacitance 120 μF±10%; $\epsilon_s$ 9.8×10$^4$; tanδ(%) 0.4; insulation resistance 1.8×10$^5$ MΩ/cm$^3$; dielectric strength 1180 V/mm; temperature character B; and voltage character 0.

EXAMPLE 17

To 100 parts by weight of the powdery semiconductor prepared in Example 15 were added 25 ml of an organotitanium compound (ATORON NTi-500, NIPPON SODA Co.) and 100 ml of MEK (methylethylketone). The slurry was mixed in a soundmill, and then dried. The resulted fine powder was heated up to 500° C. under an atmosphere of air and a temperature rise of 200° C./hr, kept at 500° C. for 2 hours, cooled to room temperature under a temperature lowering of 200° C./hr, and a dielectric powder having a dielectric film (thickness: about 1 Å) of titanium oxide on the surface of powdery semiconductor (SrTi) was obtained.

A multilayer dielectric powder condenser was prepared by the same procedure as that of Example 15 with the exception that the thus-obtained dielectric powder was used.

The multilayer dielectric powder condenser being a cut chip of 13 mm width and 22.5 mm length (about 0.35 mm thickness; about 1.0 mm inclusive of top and bottom glass layers) had: capacitance 145 μF±10%; $\epsilon_s$ 10.7×10$^4$; tanΩ(%) 0.3; insulation resistance 10.0×10$^5$ MΩ/cm$^3$; dielectric strength 1150 V/mm; temperature character B; and voltage character 0.

EXAMPLE 18

To 100 parts by weight of the powdery semiconductor prepared in Example 15 was immersed in a hydrochloric acid (reagent grade: purity 36%) diluted with 1000 times water for one hour, and dried. The dried powder was heated up to 500° C. under an atmosphere of air and a temperature rise of 200° C./hr, kept at 500° C. for 2 hours, cooled to room temperature under a temperature lowering of 200° C./hr, and a dielectric powder having a film (thickness: about 10 Å) of strontium titanate ($SrTiO_3$) on the surface of powdery semiconductor (SrTi) was obtained.

A multilayer dielectric powder condenser was prepared by the same procedure as that of Example 15 with the exception that the thus-obtained dielectric powder was used.

The multilayer dielectric powder condenser being a cut chip of 13 mm width and 22.5 mm length (about 0.35 mm thickness; about 1.0 mm inclusive of top and bottom glass layers) had: capacitance 110 $\mu F \pm 10\%$; $\epsilon_s$ $8.98 \times 10^4$; $\tan\delta(\%)$ 0.3; insulation resistance $1.9 \times 10^5$ $M\Omega/cm^3$; dielectric strength 1200 V/mm; temperature character B; and voltage character 0.

Similar multilayer dielectric powder condensers were obtained by the similar procedure using a sulfuric acid (reagent grade: purity 98%) diluted with 1000 times of water or a nitric acid (reagent grade: purity 63%) diluted with 1000 times water in place of the hydrochloric acid diluted with 1000 times water.

I claim:

1. A method for preparing multilayer dielectric powder condensers comprising the steps of:
   providing a fine dielectric powder having a dielectric film on a surface of a metal powder or a semiconductor powder;
   preparing a pasty material by kneading the dielectric powder with an organic binder;
   forming a filmy sheet from the pasty material;
   applying a paste containing a metal powder for forming electrode on the surface of the filmy sheet and drying the paste to form an applied sheet;
   piling a plurality of the applied sheets to form a piled sheets;
   placing the piled sheets between thin glass sheets made from a paste prepared by kneading a glass powder and an organic binder and pressing the thin glass sheets together; and
   subjecting the pressed sheets to a heat-treatment.

2. The method for preparing multilayer dielectric powder condensers according to claim 1, in which the dielectric film on the surface of a metal powder or a semiconductor powder is formed by baking of a vitrification agent coated on the surface.

3. The method for preparing multilayer dielectric powder condensers according to claim 1, in which the dielectric film on the surface of a metal powder or a semiconductor powder is formed by baking of a film-forming silicone oil coated on the surface.

4. The method for preparing multilayer dielectric powder condensers according to claim 1, in which the dielectric film on the surface of a metal powder or a semiconductor powder is formed by baking of a film-forming organometallic compound coated on the surface.

5. The method for preparing multilayer dielectric powder condensers according to claim 1, in which the dielectric film on the surface of a metal powder or a semiconductor powder is formed as a re-oxidized dielectric film resulted from oxidation of the surface.

6. The method for preparing multilayer dielectric powder condensers according to claim 1, in which the metal powder is selected from a group consisting of a copper alloy powder or a nickel alloy powder.

* * * * *